United States Patent
Lucci et al.

(10) Patent No.: US 11,383,827 B2
(45) Date of Patent: Jul. 12, 2022

(54) STAGGERED WHEEL LANDING GEAR TRUCK BEAM

(71) Applicant: SAFRAN LANDING SYSTEMS CANADA INC., Ajax (CA)

(72) Inventors: Adam Lucci, Toronto (CA); Randy Lee, Oshawa (CA); Gregory Eggers, Snohomish, WA (US); Zoran Pasic, Etobicoke (CA)

(73) Assignee: SAFRAN LANDING SYSTEMS CANADA INC., Ajax (CA)

( * ) Notice: Subject to any disclaimer, the term of this patent is extended or adjusted under 35 U.S.C. 154(b) by 107 days.

(21) Appl. No.: 16/856,949

(22) Filed: Apr. 23, 2020

(65) Prior Publication Data

US 2021/0331785 A1 Oct. 28, 2021

(51) Int. Cl.
| | |
|---|---|
| *B64C 25/36* | (2006.01) |
| *B64C 25/42* | (2006.01) |
| *B64C 25/18* | (2006.01) |
| *B64C 25/60* | (2006.01) |

(52) U.S. Cl.
CPC ............ *B64C 25/36* (2013.01); *B64C 25/18* (2013.01); *B64C 25/42* (2013.01); *B64C 25/60* (2013.01)

(58) Field of Classification Search
CPC ......... B64C 25/18; B64C 25/36; B64C 25/42; B64C 25/60
See application file for complete search history.

(56) References Cited

U.S. PATENT DOCUMENTS

| | | | |
|---|---|---|---|
| 2,490,485 A * | 12/1949 | Spaeth | B64C 25/34 280/685 |
| 3,485,464 A | 12/1969 | Jervan | |
| 3,974,988 A * | 8/1976 | Whitworth | B64C 25/36 244/103 R |
| 5,263,664 A * | 11/1993 | Derrien | B64C 25/66 244/102 R |
| 2003/0029966 A1 | 2/2003 | Derrien et al. | |

(Continued)

FOREIGN PATENT DOCUMENTS

| | | |
|---|---|---|
| EP | 0 705 758 A1 | 4/1996 |
| FR | 2707947 A1 | 1/1995 |

OTHER PUBLICATIONS

International Search Report dated Oct. 26, 2021, issued in corresponding International Application No. PCT/US2021/028213, filed Apr. 20, 2021, 3 pages.

(Continued)

*Primary Examiner* — Tye William Abell
(74) *Attorney, Agent, or Firm* — Christensen O'Connor Johnson Kindness PLLC

(57) ABSTRACT

A truck beam for an aircraft landing gear assembly is provided. The truck beam includes an elongate hub having first and second ends. The hub is rotatably mountable to a shock strut of the landing gear assembly. A first leg extends radially in a first direction from the first end of the hub. The first leg has an inner side facing the second end of the hub and is configured to have a first wheel rotatably mounted to the inner side about a first wheel axis. A second leg extends radially in a second direction from the second end of the hub and has an inner side facing the first end of the hub. The second leg is configured to have a second wheel rotatably mounted to the inner side of the second leg about a second wheel axis.

13 Claims, 4 Drawing Sheets

(56) References Cited

U.S. PATENT DOCUMENTS

2009/0050736 A1\* 2/2009 Bennett .................. B64C 25/58
                                                                        244/102 R
2019/0308720 A1\* 10/2019 Antoni ................... B64C 25/12

OTHER PUBLICATIONS

Written Opinion dated Oct. 26, 2021, issued in corresponding International Application No. PCT/US2021/028213, filed Apr. 20, 2021, 4 pages.

\* cited by examiner

STAGGERED WHEEL LANDING GEAR TRUCK BEAM

BACKGROUND

Aerodynamic and economic efficiency requires aircraft components to be as compact and lightweight as possible. In the case of landing gear components, a compact landing gear system decreases the amount of space required in the landing gear bay to contain the retracted landing gear. Conventional twin-wheel axled landing gear, such as those utilized on very narrow-body (aerodynamically efficient) transonic and supersonic business jets, typically require a bogie and two wheels in tandem configuration in order to fit into the landing gear bay. Conventional single axle, adjacent two wheels landing gears, such as those utilized on very narrow-body transonic business jets, are not as well suited for smaller civilian aircrafts that require super critical airfoils (supersonic travel) due to reduced landing gear bay space. Accordingly, there is a need for a lightweight, compact landing gear system that requires a reduced landing gear bay area.

SUMMARY

The subject matter disclosed herein provides a truck beam for a compact aircraft landing gear assembly. The truck beam is generally shaped like a "Z" when viewed from above (or below), wherein first and second legs extend in opposite directions from first and second ends, respectively, of a central hub. Each of the legs is configured to have a wheel rotatably mounted thereto on an inner side, i.e., on a side proximate to the hub.

A representative embodiment of a truck beam for an aircraft landing gear assembly includes an elongate hub having a first end and a second end. The hub is configured to be rotatably mounted about a mounting axis to a shock strut of the landing gear assembly. A first leg extends radially in a first direction from the first end of the hub and has an inner side facing the second end of the hub. The first leg is configured to have a first wheel rotatably mounted to the inner side of the first leg about a first wheel axis. A second leg extends radially in a second direction from the second end of the hub and has an inner side facing the first end of the hub. The second leg is configured to have a second wheel rotatably mounted to the inner side of the second leg about a second wheel axis.

In any embodiment, the first direction is a forward direction, and the second direction is an aft direction.

In any embodiment, the first direction is parallel to the second direction.

In any embodiment, the first wheel axis and the second wheel axis are parallel.

In any embodiment, the mounting axis is parallel to at least one of the first wheel axis and the second wheel axis.

In any embodiment, the truck beam further comprises an interface configured to rotatably couple a pitch trimmer to one of the first and second legs.

In any embodiment, the truck beam further comprises a first interface configured to rotatably couple a brake rod to one of the first and second legs.

In any embodiment, the truck beam further comprises a second interface configured to rotatably couple a second brake rod to the other of the first and second legs.

A representative embodiment of a landing gear assembly for an aircraft includes a shock absorbing strut coupled at one end to the aircraft, and a truck beam. The truck beam includes a hub rotatably coupled to an end of the shock absorbing strut about a first axis. The truck beam further includes first and second legs. The first leg extends in a first direction from a first end of the hub and is configured to have a first wheel rotatably mounted thereto. The second leg extends in a second direction from a second end of the hub and is configured to have a second wheel rotatably mounted thereto, wherein the hub is positioned between the first leg and the second leg.

In any embodiment, the truck beam further comprises the first wheel being rotatably mounted to an inner side of the first leg, the inner side of the first leg being proximate to the hub; and the second wheel being rotatably mounted to the second leg on an inner side of the second leg, the inner side of the second leg being proximate to the hub.

In any embodiment, each of the first and second legs includes an inner side and an outer side, the inner sides of the first and second legs being positioned between the outer sides of the first and second legs, wherein the first leg is configured to have the first wheel rotatably mounted proximate to the inner side of the first leg.

In any embodiment, the second leg is configured to have the second wheel rotatably mounted proximate to the inner side of the second leg.

In any embodiment, the hub comprises a lug extending radially from an outer surface of the hub, the hub being rotatably coupled to a clevis disposed on the shock absorbing strut.

In any embodiment, the hub comprises a clevis extending radially from an outer surface of the hub, the clevis being rotatably coupled to a lug disposed on the shock absorbing strut.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

A landing gear assembly with a reduced stowage envelope is provided. The landing gear includes a truck beam rotatably mounted to a shock strut. Wheels are mounted to the forward and aft ends of the truck beam. In order to provide a smaller stowage area, the truck beam assembly has a profile in the general shape of a "Z" when viewed from above (or below). The Z-shaped profile of the truck beam enables the wheels to be mounted closer to a central plane of the truck beam, thereby reducing the overall width of the truck beam/wheels.

Figure 1:
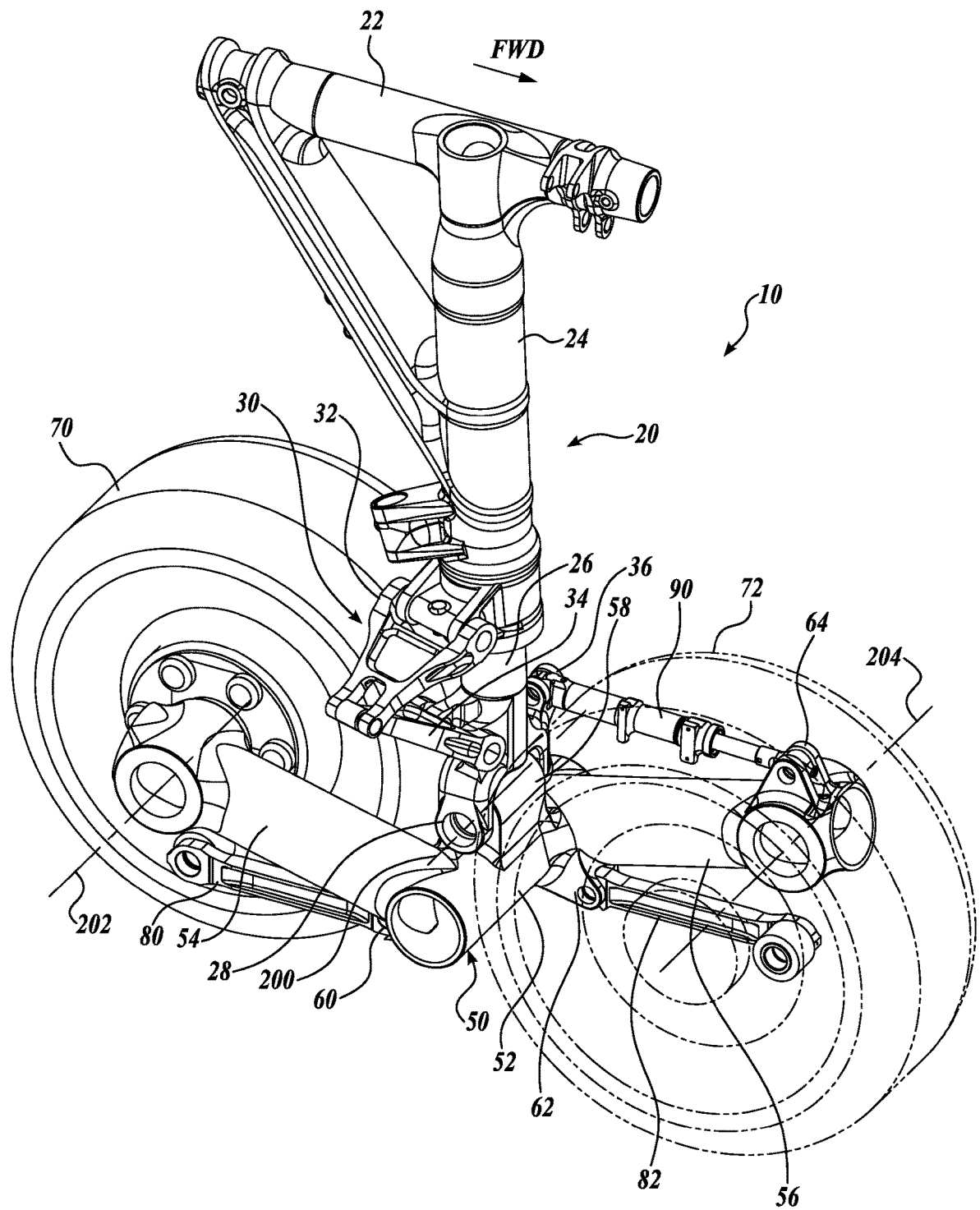
FIG. 1 shows an isometric view of a representative embodiment of an aircraft landing gear assembly according to the present disclosure.
Figure 2:
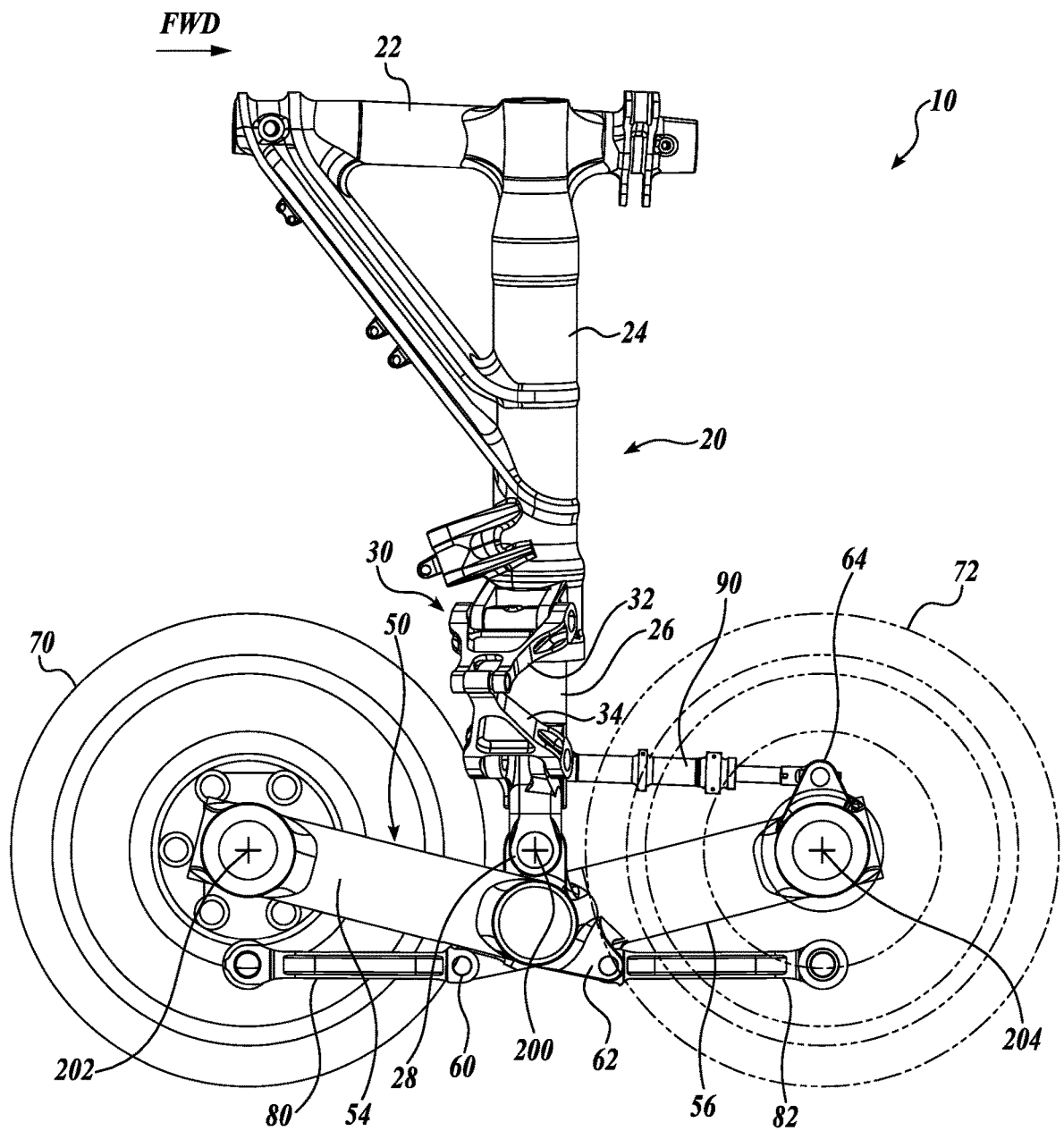
FIG. 2 shows a side view of the aircraft landing gear assembly of FIG. 1.

FIGS. 1 and 2 show a representative embodiment of a landing gear assembly 10 according to aspects of the present disclosure. The landing gear assembly 10 is mounted to the bottom of the aircraft and is configured to reciprocate between a deployed position and a stowed position. In the deployed position, the landing gear assembly 10 extends downward from the aircraft and supports a part the aircraft on a pair of wheels 70 and 72. In the stowed position, the landing gear is rotated up into a retracted position, in which the landing gear assembly is at least partially disposed within a landing gear bay in the aircraft. In some embodiments, landing gear doors cover the landing gear bay when the landing gear assembly 10 is stowed in order to improve aerodynamics and to protect the landing gear assembly and other components located within the landing gear bay.

The landing gear assembly 10 includes a shock strut 20 having a first end that is coupled to the aircraft to provide reciprocating motion between the stowed and deployed positions. In the illustrated embodiment, the upper end of the shock strut 20 includes a trunnion 22 that rotatably couples the landing gear assembly 10 to the aircraft. An actuator, (not shown) is operatively coupled to the shock strut 20 to selectively drive the landing gear assembly between the stowed and deployed positions.

The shock strut 20 is a known shock strut that operates as a damped spring. In the illustrated embodiment, the shock strut 20 includes a piston 26, an upper portion of which is slidably disposed within a cylinder 24. A lower portion of the piston 26 extends from the cylinder 24 and is rotatably coupled to a truck beam 50 about an axis 200. In the illustrated embodiment, a clevis 28 is disposed on the end of the piston 26 and engages a lug 58 formed on the truck beam 50 to provide a rotatably pinned connection therebetween.

In the embodiment shown, a torque link assembly 30 prevents the piston 26 and, thus, the truck beam 50 and wheels 70 and 72, from rotating relative to the cylinder 24 about the common (longitudinal) axis of the piston and the cylinder. A known torque link assembly 30 includes an upper torque link 32 rotatably associated with the cylinder 24 and a lower torque link 34 rotatably coupled to the piston 26. The upper and lower torque links 32 and 34 are rotatably coupled to each other to form a linkage that prevents the piston 26 from uncontrolled rotation within the cylinder 26.

Figure 3:
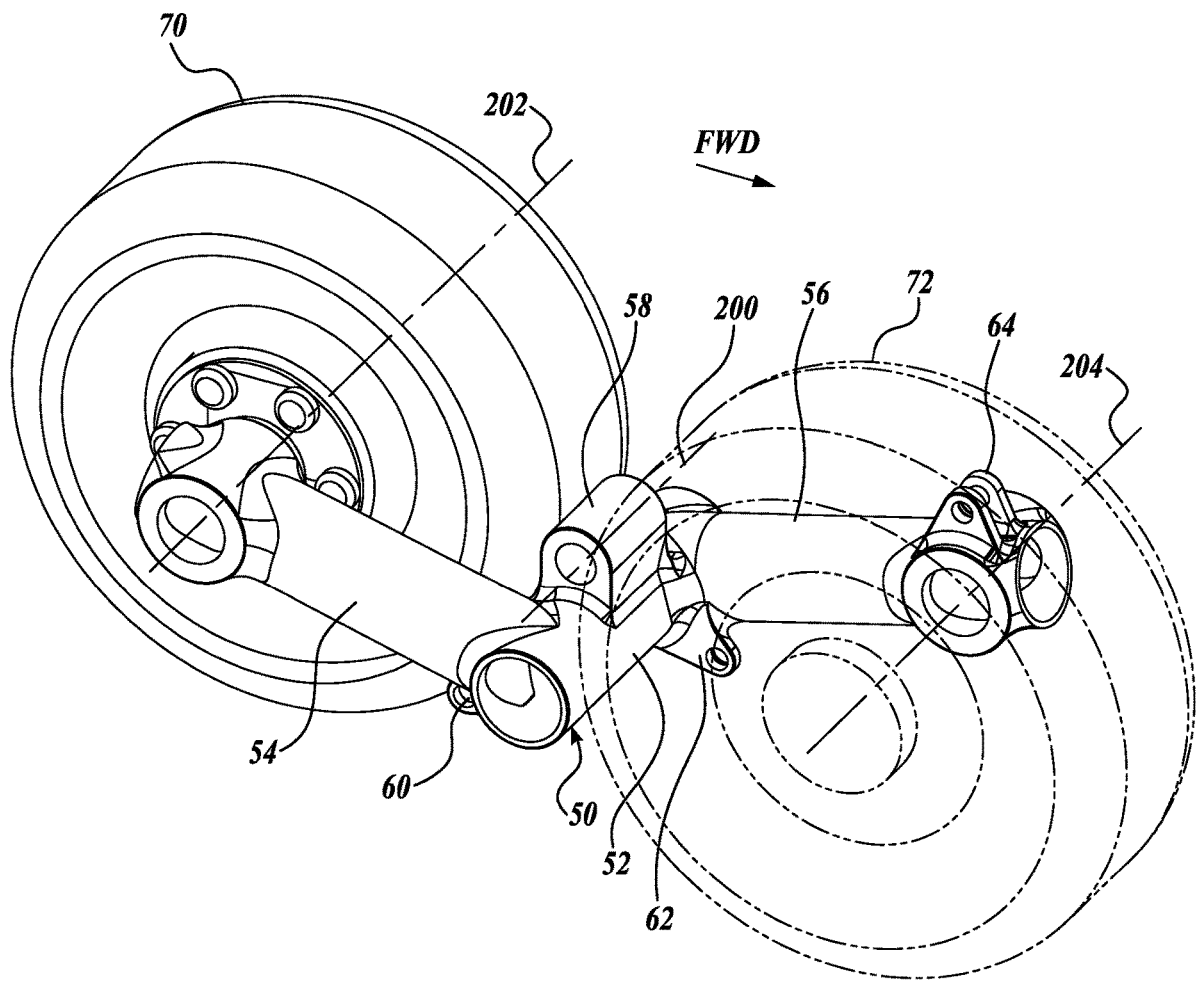
FIG. 3 shows an isometric view of the truck beam and tires of the aircraft landing gear assembly of FIG. 1.
Figure 4:
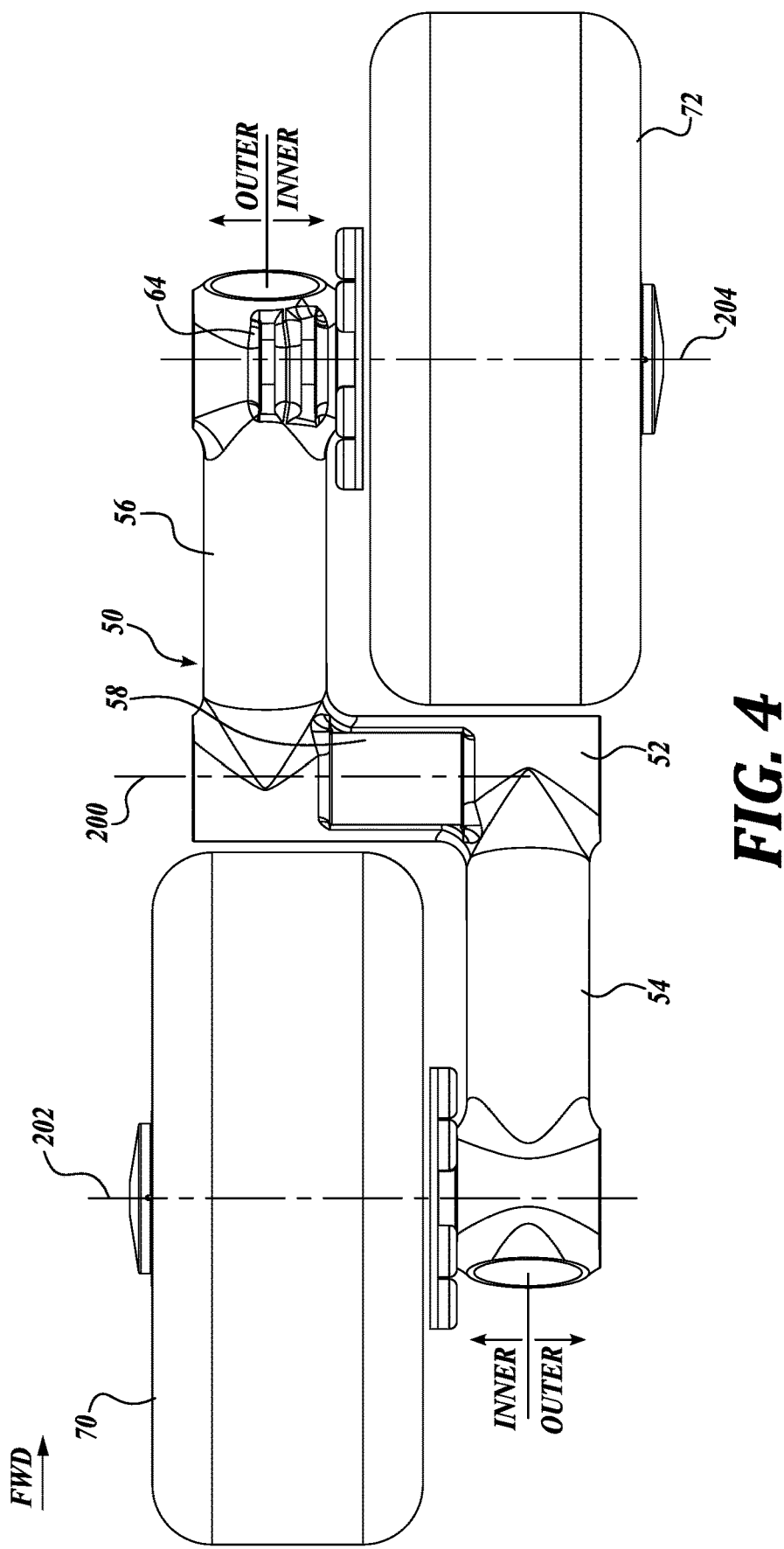
FIG. 4 shows a plan view of the truck beam and tires shown in FIG. 3.

Referring now to FIGS. 3 and 4, the truck beam 50, first (forward) wheel 70, and second (aft) wheel 72 are shown without the shock strut 20 and other components of the landing gear assembly 10 for clarity. The truck beam 50 includes a cylindrical hub 52 extending laterally, i.e., in a generally inboard/outboard direction. The lug 58 that connects the truck beam 50 to the shock strut 20 is disposed on the top of the hub 52 so that the hub and, thus, the truck beam 50 are rotatable relative to the piston 26 about an axis 200.

The truck beam 50 includes a first elongate leg 54 extending in an aft direction from a first end of the hub 52. A second elongate leg 56 extends in a forward direction from a second end of the hub 52, opposite the first end of the hub. In the illustrated embodiment, the first and second legs 54 and 56 also extend in an upward direction as the legs extend forward and aft, respectively, from the hub 52. In other embodiments, one of the legs extends upward from the hub, and the other leg extends downward from the hub 52. In other embodiments, one of the legs extends horizontally from the hub 52, and the other leg extends upward, downward, or horizontally.

It will be appreciated that other embodiments are possible, for example, wherein one leg extends in a generally forward direction from one end of the hub 52 and the other leg extends in a generally aft direction from the other end of the hub so that the legs are offset from each other and extend in opposite direction with respect to the forward and aft directions. In some embodiments, one or both legs are positioned at a right angle relative to the hub 52. In some embodiments, one or both legs form an acute or an obtuse angel relative to the hub 52. In some embodiment, one or both legs are straight. Ins some embodiments, one or both legs include one or more curved or angled portions. These and other embodiments are contemplated and should be considered within the scope of the present disclosure.

The first wheel 70 is rotatably mounted to an inner side of the first leg 54 about an axis 202, and the second 72 wheel is rotatably mounted to an inner side of the second leg 56 about an axis 204, wherein axis 202 is parallel to axis 204. As shown in FIG. 4, the term "inner" as used herein refers to a direction along the axes 202 and 204 toward a central portion of the truck beam 50. As such, the inner direction of the first leg 54 is opposite the inner direction of the second leg 56. For each leg, the term "outer" refers to the direction opposite to the "inner" direction for that particular leg.

Still referring to FIG. 4, the offset configuration of the truck beam legs 54 and 56 in combination with the first and second wheels 70 and 72 being mounted to the inner sides of the first and second legs 54 and 56, respectively, provides a more compact truck beam/wheel configuration. In this regard, the total width of the truck beam 50 and the mounted wheels 70 and 72 is less than the combined widths of the wheels. In contrast, known landing gear assemblies with wheels mounted to opposite side of a truck beam typically have a width that is the combined width of the wheels in addition to a portion of the width of the truck beam, or axle clevis for two-wheeled adjacent gears. Thus, by offsetting the mounting position of the wheels 70 and 72 toward or past the center of the truck beam 50, the overall width of the truck beam and mounted wheels in accordance with aspects of the disclosure is reduced. This offset provides a more compact landing gear assembly that requires less room in the landing gear bay when in the stowed position.

Referring back to FIGS. 1 and 2, the landing gear assembly 10 optionally includes a pitch trimmer 90 that positions the truck beam 50 relative to the shock strut 20. The pitch trimmer 90 is a known pitch trimmer having one end rotatably coupled to a clevis 36 fixedly positioned relative to the piston 26 and an opposite end rotatably coupled to a clevis 64 fixed on the second leg 56. In some embodiments the pitch trimmer is fixed to the main fitting 24 in lieu of the piston clevis. The pitch trimmer can be coupled to a clevis 64 which can be present on either leg 56 or 54 or even both if dual pitch trimmers are utilized.

In some embodiments, the pitch trimmer 90 is a hydraulically operated telescopic actuator that selectively extends and/or retracts to selectively rotate the truck beam 50 relative to the piston 26 about axis 200. In some embodiments, the pitch trimmer 90 is a passive pitch trimmer that utilizes biasing elements, such as springs, and/or aerodynamic loads to position the truck beam. It will be appreciated that the present disclosure is not limited to the inclusion of a pitch trimmer or of a particular type of pitch trimmer.

The illustrated embodiment of a landing gear assembly 10 includes a known brake assembly (not shown) corresponding to each of the first and second wheels 70 and 72. Such brake assemblies typically apply a torque to elements of the brake during braking, wherein the torque is reacted by one or more brake rods. The reaction by the brake rods prevents the brake assemblies from co-rotating with the wheel when the brake is engaged. The brake rods typically connect a point on the brake assembly with an anchor point.

As shown in FIGS. 1 and 2, the truck beam 50 includes a first brake rod clevis 60 located proximate to the intersection of the first leg 54 and the hub 52 and a second brake rod clevis 62 located proximate to the intersection of the second leg 56 and the hub 52. The first brake rod clevis 60 provides an anchor point for the first brake rod 80, and the second brake rod clevis 62 provides an anchor point for the second brake rod 82. It will be appreciated that each brake rod clevis is configured to rotatably engage a lug formed on the end of a brake rod; however, other interfaces are contemplated. In some embodiments, a lug is formed on the truck beam 50, and a corresponding clevis is formed on the end of the brake rod. In some embodiments, the location of the lug and/or clevis varies from the illustrated embodiment. In some embodiments the brake rods are positioned on the upper portion of the brakes, with the brake rods 80 and 82 attach to lugs on the piston clevis. These and other alternate embodiments are contemplated and should be considered within the scope of the present disclosure.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed.

In the foregoing description, specific details are set forth to provide a thorough understanding of exemplary embodiments of the present disclosure. It will be apparent to one skilled in the art, however, that the embodiments disclosed herein may be practiced without embodying all of the specific details. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value.

For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the disclosed subject matter in which an exclusive property or privilege is claimed are defined as follows:

1. A truck beam for an aircraft landing gear assembly, comprising:
   an elongate hub having a first end and a second end, the hub being configured to be rotatably mounted about a mounting axis to a shock strut of the landing gear assembly;
   a rigid first leg extending radially in a first direction from the first end of the hub, the first leg having an inner side facing the second end of the hub, the first leg being configured to have a first wheel rotatably mounted to the inner side of the first leg about a first wheel axis; and
   a rigid second leg extending radially in a second direction from the second end of the hub, the second leg having an inner side facing the first end of the hub, the second leg being configured to have a second wheel rotatably mounted to the inner side of the second leg about a second wheel axis, wherein the second leg is fixedly oriented relative to the first leg.

2. The truck beam of claim 1, wherein the first wheel axis and the second wheel axis are parallel.

3. The truck beam of claim 1, wherein the mounting axis is parallel to at least one of the first wheel axis and the second wheel axis.

4. The truck beam of claim 1, further comprising an interface configured to rotatably couple a pitch trimmer to one of the first and second legs.

5. The truck beam of claim 1, wherein the first direction is a forward direction, and the second direction is an aft direction.

6. The truck beam of claim 5, wherein the first direction is parallel to the second direction.

7. The truck beam of claim 1, further comprising a first interface configured to rotatably couple a brake rod to one of the first and second legs.

8. The truck beam of claim 7, further comprising a second interface configured to rotatably couple a second brake rod to the other of the first and second legs.

9. A landing gear assembly for an aircraft, comprising:
   a shock absorbing strut coupled at one end to the aircraft; and
   a truck beam, comprising:
   a hub rotatably coupled to an end of the shock absorbing strut about a first axis;

a rigid first leg extending in a first direction from a first end of the hub, the first leg being configured to have a first wheel rotatably mounted thereto; and a rigid second leg extending in a second direction from a second end of the hub, the second leg being configured to have a second wheel rotatably mounted thereto, wherein the hub is positioned between the first leg and the second leg, wherein the second leg is fixedly oriented relative to the first leg, wherein the first wheel is rotatably mounted to an inner side of the first leg, the inner side of the first leg being proximate to the hub; and the second wheel is rotatably mounted to the second leg on an inner side of the second leg, the inner side of the second leg being proximate to the hub.

10. The landing gear assembly of claim 9, wherein the hub comprises a lug extending radially from an outer surface of the hub, the hub being rotatably coupled to a clevis disposed on the shock absorbing strut.

11. The landing gear assembly of claim 9, wherein the hub comprises a clevis extending radially from an outer surface of the hub, the clevis being rotatably coupled to a lug disposed on the shock absorbing strut.

12. A landing gear assembly for an aircraft, comprising:
a shock absorbing strut coupled at one end to the aircraft; and
a truck beam, comprising:
    a hub rotatably coupled to an end of the shock absorbing strut about a first axis;
    a rigid first leg extending in a first direction from a first end of the hub, the first leg being configured to have a first wheel rotatably mounted thereto; and
    a rigid second leg extending in a second direction from a second end of the hub, the second leg being configured to have a second wheel rotatably mounted thereto, wherein the hub is positioned between the first leg and the second leg, wherein the second leg is fixedly oriented relative to the first leg,
    wherein each of the first and second legs includes an inner side and an outer side, the inner sides of the first and second legs being positioned between the outer sides of the first and second legs, wherein the first leg is configured to have the first wheel rotatably mounted proximate to the inner side of the first leg.

13. The landing gear assembly of claim 12, wherein the second leg is configured to have the second wheel rotatably mounted proximate to the inner side of the second leg.

\* \* \* \* \*